Dec. 4, 1928.

G. R. CUNNINGTON 1,694,033

SHIELD FOR VEHICLE BRAKES

Filed Dec. 10, 1925

INVENTOR.

George R. Cunnington
BY
Fay. Oberlin & Fay
ATTORNEYS.

Patented Dec. 4, 1928.

1,694,033

UNITED STATES PATENT OFFICE.

GEORGE R. CUNNINGTON, OF AKRON, OHIO, ASSIGNOR TO THE PAINE-CUNNINGTON COMPANY, OF CLEVELAND, OHIO, A CORPORATION OF OHIO.

SHIELD FOR VEHICLE BRAKES.

Application filed December 10, 1925. Serial No. 74,637.

In the application of protective means for preventing access of dirt and water, etc., to the brake elements of motor vehicles, it is desirable that the construction be not only efficient, but also uncomplicated. And particularly with wheels of the open or artillery type, it is desirable that the construction should not include elements to conspicuously change the appearance of the wheel.

To the accomplishment of the foregoing and related ends, the invention, then, consists of the means hereinafter fully described and particularly pointed out in the claims, the annexed drawing and the following description setting forth in detail certain features embodying the invention, such disclosed means constituting, however, but several of various forms in which the principle of the invention may be used.

Figure 1:
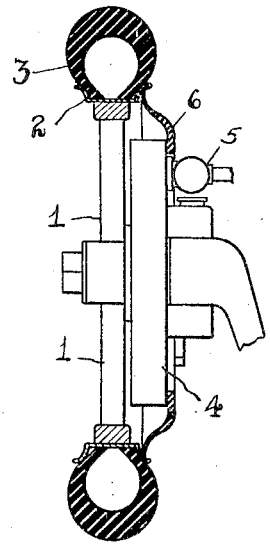
Figure 2:
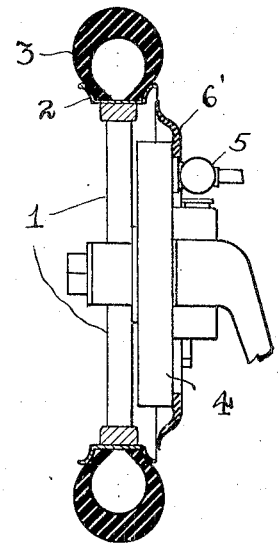
Figure 3:
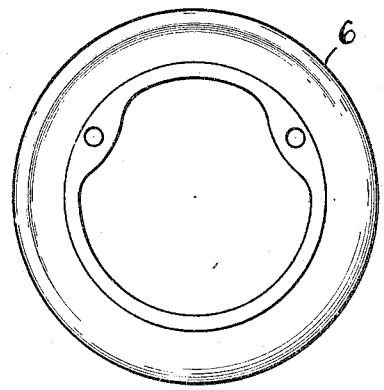

In said annexed drawing:

Fig. 1 is a sectional view of a wheel with a shield assembly in accordance with the present invention; Fig. 2 is a similar view of a modification; and Fig. 3 is an elevation of a shield.

As shown in Fig. 1, a motor vehicle wheel having the spokes 1, rim 2, tire 3, etc., carries a brake housing 4 and a brake-actuating connection 5, all of any usual or desired form. Supported adjacent the brake housing and more especially at the marginal portion where the housing presents the usual narrow annular working space between rotating and stationary parts, is a shield 6 which may be attached to supporting means in any convenient manner, for instance by cap screws. While the shield may extend centrally clear up to the axle if desired, ordinarily it is preferable to skeletonize the shield centrally in so far as feasible, and it may thus take the form of a generally annular contour with centrally-directed portions for attachment to the supporting means, usually the fixed or non-rotating side plate of the housing. The general contour form of the shield is what may be termed dished as will be seen by reference to the drawing, the flat or centrally directed portion being as indicated secured to the supporting means and thence a peripheral portion extending laterally and outwardly to guard or partially cover the juncture between rotating and non-rotating parts of the brake housing. In Fig. 2, the dished shield is shown as extending only a relatively slight distance laterally and outwardly about the housing, while in Fig. 1 the form contemplated involves a peripheral portion extending not only laterally and outwardly about the housing but thence also further outwardly toward the wheel rim, it being feasible in some cases that the shield may be closely positioned to the rim. It will be appreciated however, that the utilities and advantages of the invention may be applied and realized in any proportion desired, from the narrow form in which the working juncture between non-rotating and rotating parts of the brake housing is shielded by the dished peripheral portion, up to the more extensive form of shield as shown in Fig. 1.

The materials of which the shield member may be constructed vary somewhat in accordance with the particular service in view, and may be metal, fiber, laminated rubber and fabric, rubber reenforced with metallic elements or rubber per se. Preferably I employ rubber and make up the shield from a suitable rubber composition and so cure or vulcanize that the inner or centrally directed portions are cured or vulcanized harder than the peripheral portions, desirably the degree of cure being shaded off from the center toward the periphery so as to provide a shield capable of secure attachment centrally and yet safe against breakage at the peripheral portions. Ordinarily the overhang of the average tire, and particularly the so-called balloon type of tire, is such as to almost totally eliminate any chance of direct impact against the shield element, but by the provision of a construction as stated, a shield may be provided which is fundamentally safeguarded against damage in practically any conceivable use to which it might be subjected.

Other modes of applying the principle of my invention may be employed instead of those explained, change being made as regards the features herein disclosed, provided the means stated by any of the following claims or the equivalent of such stated means be employed.

I therefore particularly point out and distinctly claim as my invention:

1. In a device of the character described, a shield for a vehicle-wheel brake assembly of a type comprising rotary and non-rotary parts, said shield being of a generally circular form with a substantially planar attaching portion and an extension for guarding the opening between such rotary and non-rotary parts, said extension being slightly resilient.

2. In a device of the character described, a shield for a vehicle-wheel brake assembly of a type comprising rotary and non-rotary parts, said shield being of a generally circular form with a centrally-directed attaching portion and a slightly resilient peripheral portion extending laterally and outwardly.

3. As an article of manufacture, a shield for use with vehicle-wheels, said shield being of rubber and of a generally circular form with a substantially planar attaching portion and an extending guard portion.

4. As an article of manufacture, a shield for use with vehicle-wheels, said shield being of rubber and of a generally circular form with a centrally-directed attaching portion and a peripherally extending guard portion.

5. As an article of manufacture, a shield for use with vehicle-wheels, said shield being of rubber and of a generally circular form with an attaching portion and an extending guard portion, said attaching portion being vulcanized harder than the remainder.

6. As an article of manufacture, a shield for use with vehicle-wheels, said shield being of rubber and of a generally circular form with a centrally-directed attaching portion and a peripherally extending guard portion, said centrally-directed portion being vulcanized harder than the remainder.

7. In a device of the character described, the combination of vehicle-wheel brake housing and a shield member of generally annular shape having a centrally-directed portion attached to said housing and a slightly resilient peripheral portion extending laterally and outwardly about the housing.

8. In a device of the character described, the combination of vehicle-wheel brake means and a shield member of rubber of generally annular shape adjacent said brake means.

9. In a device of the character described, the combination of vehicle-wheel brake means and a shield member of rubber of generally annular shape having a centrally-directed portion for attachment and a peripheral portion extending laterally and outwardly about the brake means.

10. In a device of the character described, the combination of vehicle-wheel brake means and a shield member of rubber having a generally annular shape with a centrally-directed portion for attachment, said centrally-directed portion being vulcanized harder than the remainder.

11. In a device of the character described, the combination of vehicle-wheel brake means and a shield member of rubber of generally annular shape having a centrally-directed portion for attachment and a peripheral portion extending laterally and outwardly about the brake means, said centrally-directed portion being vulcanized harder than the remainder.

Signed by me this 8th day of December, 1925.

GEORGE R. CUNNINGTON.